(12) United States Patent
Tsutsumikoshi (10) Patent No.: US 6,405,821 B2
(45) Date of Patent: Jun. 18, 2002

(54) POWER UNIT OF MOTORCYCLE (75) Inventor: Shinobu Tsutsumikoshi, Hamamatsu (JP)

(73) Assignee: Suzuki Kabushiki Kaisha, Hamamatsu (JP)

( * ) Notice: Subject to any disclaimer, the term of this patent is extended or adjusted under 35 U.S.C. 154(b) by 0 days.

(21) Appl. No.: 09/866,716

(22) Filed: May 30, 2001

(30) Foreign Application Priority Data

May 30, 2000 (JP) ........................ 2000-160732

(51) Int. Cl.[7] .......................... B62K 11/04; B62M 7/00
(52) U.S. Cl. ........................ 180/226; 180/230
(58) Field of Search .......................... 180/219, 227, 180/228, 230, 226, 291, 374

(56) References Cited

U.S. PATENT DOCUMENTS

| | | | | |
|---|---|---|---|---|
| 4,662,471 A | * | 5/1987 | Kondo et al. | 180/226 |
| 5,101,924 A | * | 4/1992 | Yamigiwa et al. | 180/220 |
| 5,263,549 A | * | 11/1993 | Dick | 180/226 |
| 5,391,124 A | * | 2/1995 | Kasahara | 475/198 |
| 5,406,154 A | * | 4/1995 | Kawaguchi et al. | 310/67 R |
| 6,073,719 A | * | 6/2000 | Ohmika et al. | 180/219 |

FOREIGN PATENT DOCUMENTS

| | | | |
|---|---|---|---|
| JP | 2-144275 | * | 6/1990 |
| JP | 2001-97273 | * | 4/2001 |

* cited by examiner

*Primary Examiner*—Avraham H. Lerner
(74) *Attorney, Agent, or Firm*—Oblon, Spivak, McClelland, Maier & Neustadt, P.C.

(57) ABSTRACT

A power unit of the motorcycle is provided with an engine unit in which a counter shaft is pivoted to a rear portion in a casing of an engine body provided with a crankshaft disposed along a motorcycle body width direction and a bracket having a fitting hole extending rearward so as to pass through in the width direction is formed in a rear portion outside the casing, a transmission unit and a bevel unit which are pivoted in a manner to be independent from the engine unit. One side surface of a front portion of the transmission unit is fixed to one side surface of a rear portion of the casing in the engine unit so as to connect the counter shaft to the input shaft to be integrally rotatable, the same side surface of the rear portion in the transmission unit is fitted and fixed to one side surface of the bracket so as to fit and fix the bevel unit to another side surface of the bracket. Thus, the output shaft is connected to a bevel input shaft to be integrally rotatable.

6 Claims, 7 Drawing Sheets

POWER UNIT OF MOTORCYCLE

BACKGROUND OF THE INVENTION

The present invention relates to a power unit of a motorcycle such as a scooter-type vehicle or the like.

Generally, the power unit of the scooter-type vehicle has a structure in which a belt-type transmission unit (speed change mechanism or change gear) is integrally connected to a rear portion of an engine and a rear wheel is directly pivoted to a most rear section of the transmission unit. A front portion of the power unit is pivoted to a body frame of a motorcycle (which may be called vehicle body frame, hereinlater) and a rear portion thereof is suspended to the vehicle body frame by means of a shock absorber, so that a whole of the power unit is swung entirely vertically together with the rear wheel so as to achieve a part of a swing arm of the rear wheel.

In accordance with the structure mentioned above, it becomes advantageous that a capacity of a luggage space placed above the power unit can be secured to be increased and a riding function (running felling) can be improved by making an engine vibration hard to be transmitted to the frame side. However, on the contrary, since a weight of the whole of the power unit becomes heavy in the case that a displacement of the engine is increased, a shared weight of the rear wheel is increased, a weight may be improperly distributed between front and rear wheels and a support rigidity of the rear wheel becomes insufficient. In such case, arrangement or layout of respective parts or elements of a motorcycle may be restricted.

Then, as shown in Japanese Patent Laid-Open Publications Nos. HEI 10-324287 (Prior Art 1) and HEI 11-129969 (Prior Art 2), there have been developed a scooter-type vehicle in which an engine and a transmission unit are fixed to a vehicle body frame side and only a shaft drive apparatus extending rearward from the transmission unit is made vertically swingable so as to drive the rear wheel. Accordingly, it is possible to mount an engine corresponding to a heavy load, which is the same as that in the normal motorcycle to a front side of the vehicle body frame so as to make a weight distribution between the front and rear wheels proper.

However, in the structure described in the above Prior Art 1, since a drive pulley, a driven pulley, a belt and the like in the transmission unit are exposed, the transmission is easily damaged by foreign materials such as dirt, sands, stones or the like splashed by the rear wheel during a running of a motorcycle.

On the contrary, in the structure described in the above Prior Art 2, since a drive pulley of the transmission unit is coaxially provided in a crankshaft of an engine, a whole of the transmission unit protrudes sideward. Accordingly, this apparatus lacks a compact size.

Further, since the engine, the transmission and a bevel gear mechanism corresponding to an output take-out portion are received within one casing so as to be united, it is necessary to produce and assemble all of the parts mentioned above at the same production site, so that a productivity is significantly made worse. Further, in the case of intending to change any one of specifications such as an engine output, a gear ratio or the like, it is necessary to change a whole of the unit, so that it is hard to apply the unit to various kinds of vehicles. Additionally, in the case of performing maintenance of any one portion, it is necessary to disassemble a whole of the unit, which may deteriorate the ease maintenance.

SUMMARY OF THE INVENTION

An object of the present invention is to substantially eliminate disadvantages or inconveniences encountered in the prior arts mentioned above and to provide a power unit of a motorcycle capable of making a power unit compact, improving a productivity thereof, making ease of maintenance, improving a manufacturing quality and the like, and moreover, the present invention makes it possible to be applied to various kinds of vehicles to reduce processing man-hours. It also becomes possible to well secure a rigidity of the power unit itself and a support rigidity of the power unit to the vehicle body frame.

This and other objects can be achieved according to the present invention by providing a power unit of a motorcycle comprising:

an engine unit in which a counter shaft rotating while interlocking with a crankshaft is supported in parallel at a rear portion in a casing of an engine body provided with the crankshaft disposed along a width direction of a motorcycle body, and a bracket portion having a fitting hole extending rearward so as to pass through in the width direction of the motorcycle body is formed in a rear portion outside the casing;

a transmission unit in which an input shaft and an output shaft are pivoted at front and rear portions in another casing different from the casing of the engine unit so as to constitute a transmission device; and a bevel unit receiving a bevel input shaft disposed along the width direction of the motorcycle body, a bevel output shaft disposed along a longitudinal direction of the motorcycle body and a bevel gear which are all disposed in a further casing so as to take out an engine output rearward from the bevel output shaft, wherein one side surface of a front portion, in the longitudinal direction of the motorcycle body, of the transmission unit is fixed to one side surface of a rear portion of the casing in the engine unit so as to connect the counter shaft to the input shaft to be integrally rotatable, a bearing boss of the output shaft is closely fitted to the fitting hole in the bracket portion with one side surface of the rear portion of the transmission unit being disposed adjacent to one side surface of the bracket portion of the engine unit, and the bearing boss of the bevel input shaft is closely fitted and fixed to the fitting hole of the bracket portion with the bevel unit being disposed adjacent to another side surface of the bracket portion so as to connect the output shaft to the bevel input shaft to be integrally rotatable.

In a preferred embodiment of the above aspect, the counter shaft receiving portion of the engine unit is arranged, in an offset manner, close to one side with respect to a center line of the motorcycle body in a plan view and the bracket portion is extended to a rear portion thereof so as to provide a plan shape of the engine unit to be a substantially L shape and a plan shape of the transmission unit is formed in a substantially L shape to thereby arrange the transmission unit on a side of the center line of the motorcycle body in the bracket portion so as to assemble substantially L-shaped portions of the engine unit and the transmission unit with each other to provide a substantially rectangular shape, and on the other hand, the bevel unit is arranged on a side opposite to the center line of the vehicle body in the bracket portion.

The bracket portion of the engine unit, the transmission unit and the bevel unit are fastened together by a fastening member disposed along the width direction of the motorcycle body.

The motorcycle body frame fixing portion of the power unit is formed to the bracket portion of the engine unit.

The transmission device is a belt-type change gear device disposed in the another casing having a three-piece structure. The belt-type change gear device includes an input shaft supported in parallel to the crankshaft of the engine unit and the input shaft is operatively coupled with the bevel input shaft.

According to the structures and characters of the power unit of the motorcycle such as scooter-type vehicle of the present invention mentioned above, since the engine unit, the transmission unit and the bevel unit can be respectively manufactured in different production sites, a productivity and ease of maintenance of the power unit are improved and it is possible to apply to various kinds of vehicles. Furthermore, since the structure is made such that the transmission unit and the bevel unit are coaxially fitted and fixed to the fitting hole of the bracket portion in the engine unit, a manufacturing quality can be improved and processing man-hours can be reduced, and further a rigidity of a whole of the power unit is increased.

Furthermore, in accordance with the structure mentioned above, since no dead space is generated between the engine unit and the transmission unit, and there is no case that any one of the transmission unit and the bevel unit arranged laterally at the back of the engine unit protrudes widely to a side direction from a lateral width of the engine unit, sizes in a longitudinal direction and a width direction of the power unit can be made compact.

In comparison with the case that the transmission unit and the bevel unit are respectively fastened by exclusive fastening members, since the number of the fastening members is reduced, and assembling man-hours can be reduced accordingly, a productivity of the power unit can be improved.

Still furthermore, since the connecting portions of the respective units constituting the power unit are fixed to the vehicle body frame, the supporting rigidity of the whole of the power unit can be increased.

As mentioned above, in summary, in accordance with the power unit of the motorcycle of the present invention, it is possible to make a power unit compact, to improve a productivity, ease of maintenance, a manufacturing quality and the like, to make it possible to be applied to various kinds of vehicles, to reduce processing man-hours, and to secure a rigidity of the power unit itself and a support rigidity of the power unit to the vehicle body frame.

The nature and further characteristic features of the present invention will be made more clear from the following descriptions made with reference to the accompanying drawings.

DESCRIPTION OF THE PREFERRED EMBODIMENT

A description will be given of an embodiment in accordance with the present invention with reference to the accompanying drawings.

Figure 1:
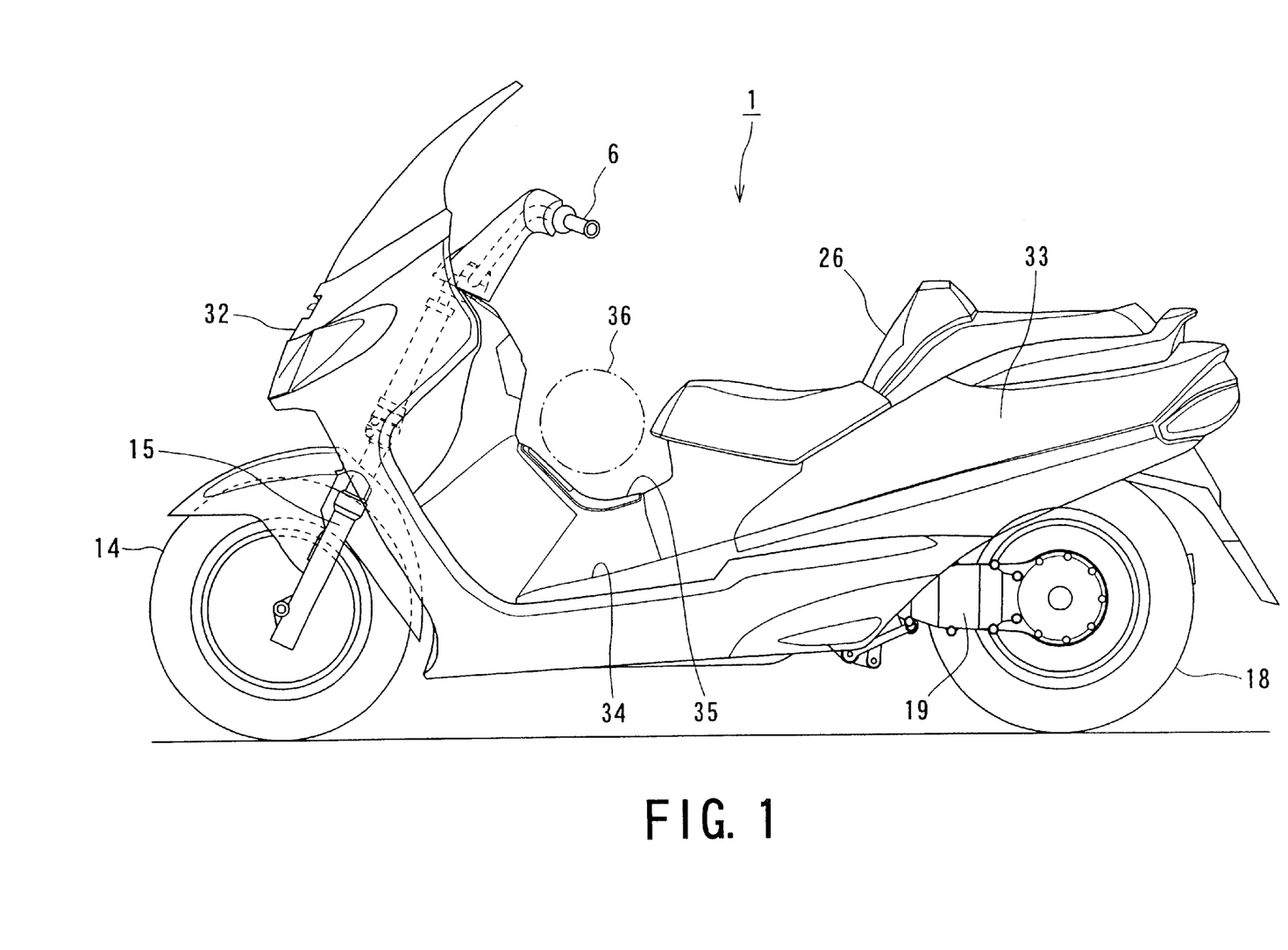
FIG. 1 is a left side elevational view showing an embodiment of a scooter-type motorcycle on which a power unit according to the present invention is mounted.
Figure 2:
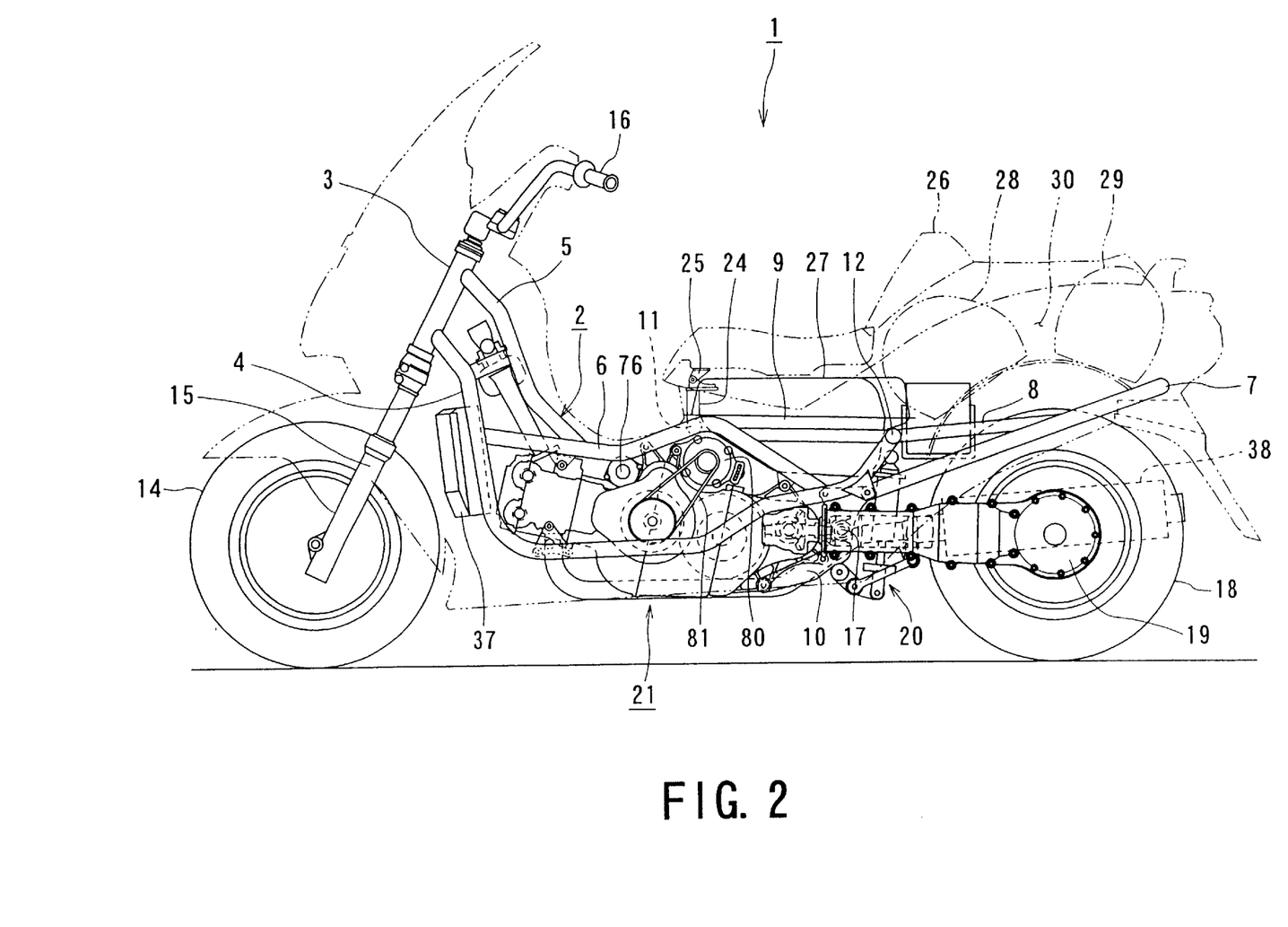
FIG. 2 is a left side elevational view showing an internal structure of the motorcycle.
Figure 3:
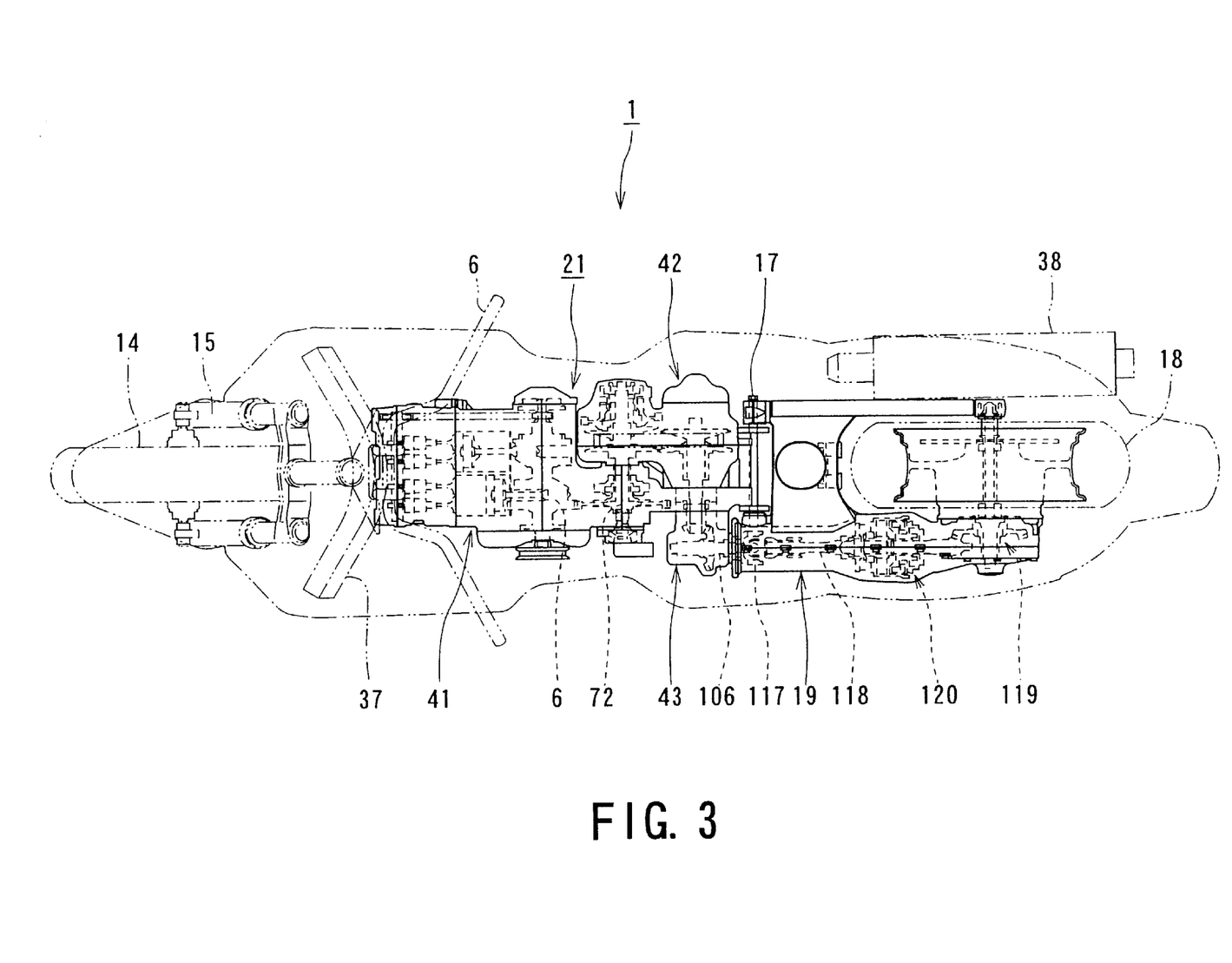
FIG. 3 is a plan view of the motorcycle showing the internal structure of the motorcycle.

With reference to FIGS. 1 to 3, a motorcycle 1 is provided with a vehicle body frame 2 made of a steel pipe. The vehicle body frame 2 is provided with a head pipe 3 positioned in a front end (left-side end in the longitudinal direction of the motorcycle body, the same being applied hereinlater) thereof, a pair of right and left down pipes 4, upper pipes 5 and middle pipes 6 extending rearward from the head pipe 3, a rear pipe 7 and a rear stay 8 connected to a portion near a rear end of the down pipe 4, a pair of right and left seat pipes 9, and a pair of right and left pivot plates 10 positioned in a substantially central portion so as to provide a substantially underbone-type structure. In this case, a pair of right and left pipe members (4, 5, 6) are connected by a plurality of bridge pipes 11, 12 ... (the others are not shown) extending in a width direction of the vehicle body (motorcycle body).

A front fork 15 supporting a front wheel 14 is pivoted to the head pipe 3 together with a handle bar 16 or the like, a pivot shaft 17 is provided between the right and left pivot plates 10, and a swing transmission unit 19 supporting a rear wheel 18 is pivoted to the pivot shaft 17 so as to be suspended by a suspension mechanism 20. Further, a power unit 21 is suspended and supported by the down pipe 4, the middle pipe 6 and the pivot plate 10, and a power thereof is transmitted to the rear wheel 18 through the swing transmission unit 19.

An interval between the right and left middle pipes 6 is made narrower than an interval between the down pipes 4. The middle pipes 6 extend above the power unit 21 and the down pipes 4 extend along both side portions of the power unit 21. Further, a seat hinge 25 is provided in an upper end of a seat stay 24 extending upward from the bridge pipe 11 provided near a bent point of the middle pipe 6, and a front end of a seat 26 is supported to the seat hinge 25. The seat 26 opens and closes around the seat hinge 25, and a fuel tank 27 and a luggage space 30 capable of receiving helmets 28 and 29 and the like therein are formed below the seat 26.

A whole of the vehicle body is covered by a front cowling 32 and a frame cover 33 made of synthetic resin, so that internal devices or equipments can be protected as well as an outer appearance of the motorcycle 1 is improved. Furthermore, a pair of right and left step boards 34 (refer to FIG. 1) positioned above the down pipe 4 are integrally formed in the frame cover 33, and the middle pipes 6 and the power unit 21 are received within a center console 35 formed therebetween. An upper space of the center console 35 forms a foot space 36 used when a rider rides on the seat 26.

In this case, a radiator 37 for cooling an engine unit 41 mentioned below is provided in the down pipe 4 so as to be positioned immediately at the rear portion of the front wheel 14, and an exhaust muffler 38 connected to a cylinder head 46 of the engine unit 41 is provided in a right side of the rear wheel 18.

Figure 5:
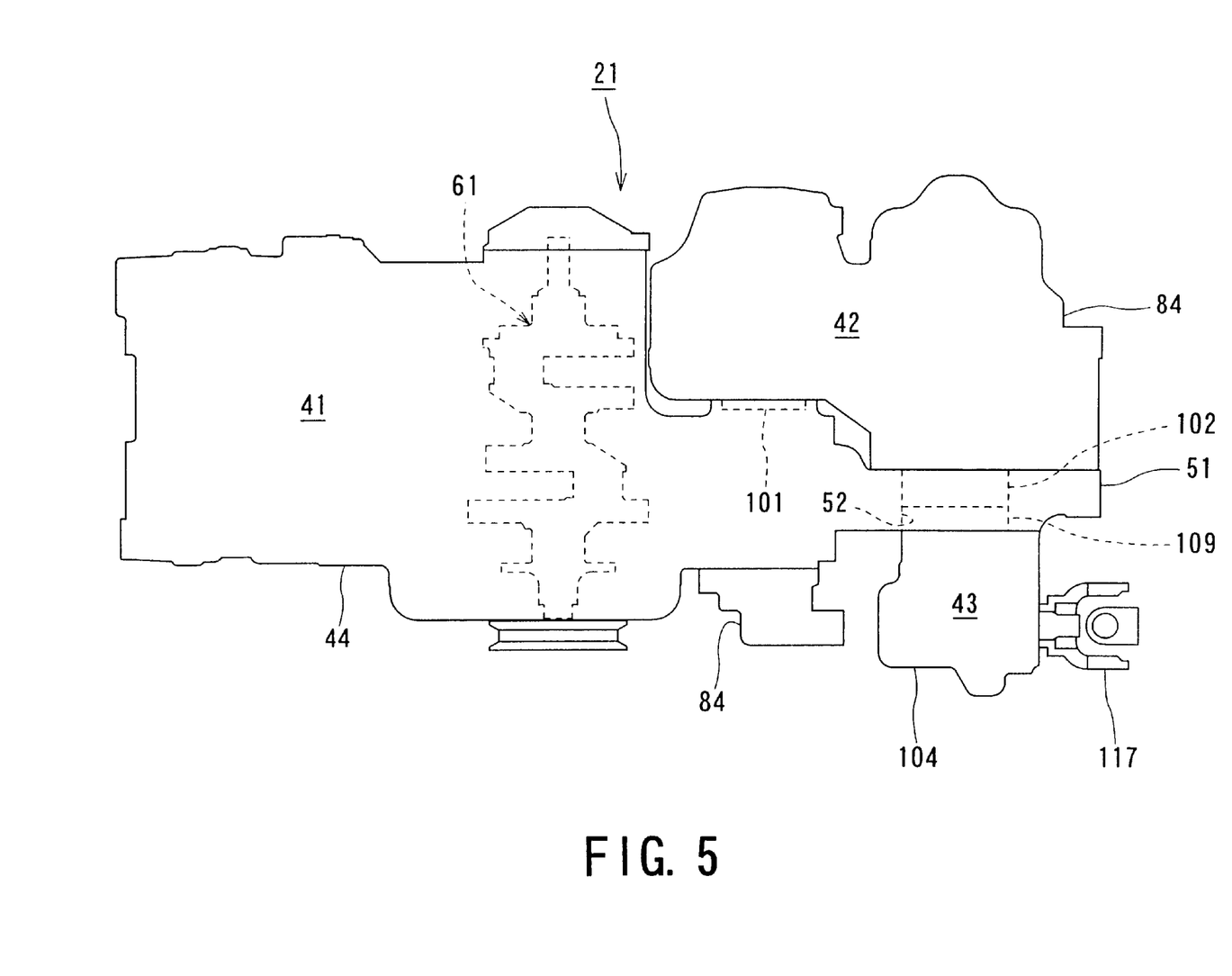
FIG. 5 is a schematic plan view of the power unit.
Figure 6:
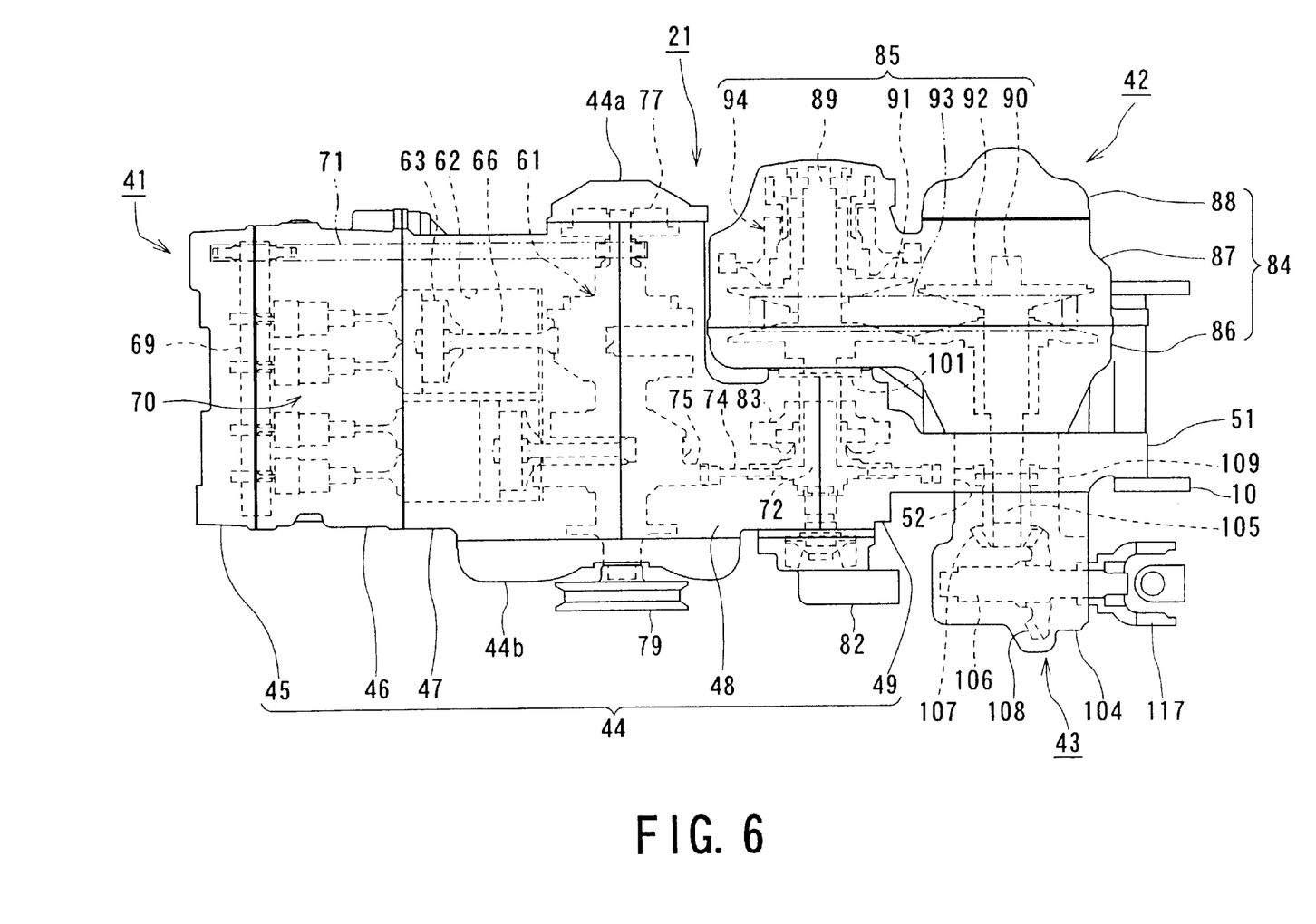
FIG. 6 is a plan view of the power unit.
Figure 7:
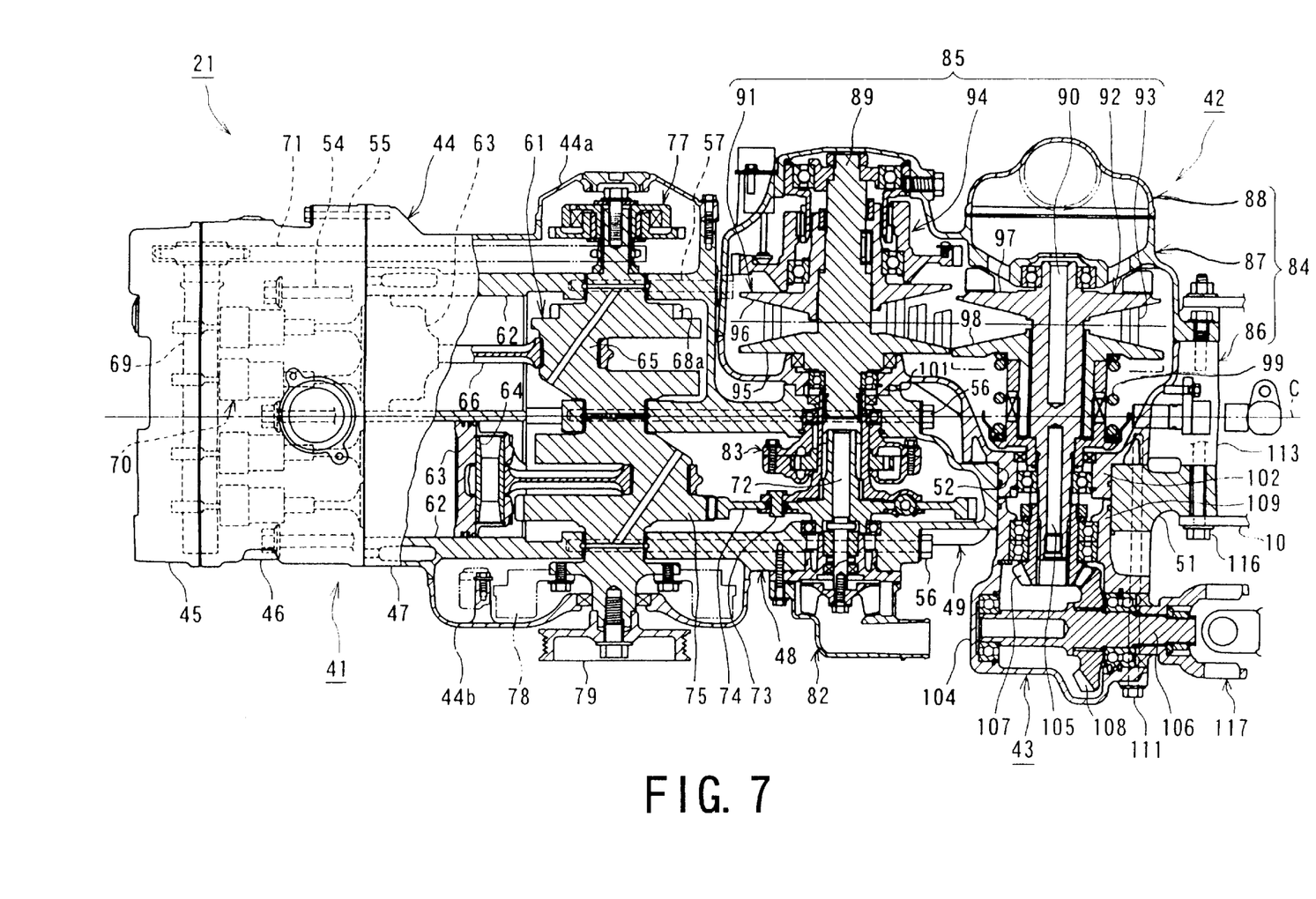
FIG. 7 is a horizontal sectional view of a power unit of the embodiment according to the present invention taken along a line VII-VII in FIG. 4.

Next, with reference to FIGS. 5 to 7, the power unit 21 according to the described embodiment is a composite body in which the engine unit 41, a transmission unit 42 and a bevel unit 43 are combined.

A casing 44 of the engine unit 41 has a structure in which a head cover 45, a cylinder head 46, a cylinder block 47, a crankcase 48 and a rear cover 49 are combined from a forward portion in this order, a vertical-plate-shaped bracket portion 51 extending rearward is integrally formed in a rear portion of the rear cover 49, and a fitting hole 52 extending through in a direction of vehicle width is pierced in the bracket portion 51.

Figure 4:
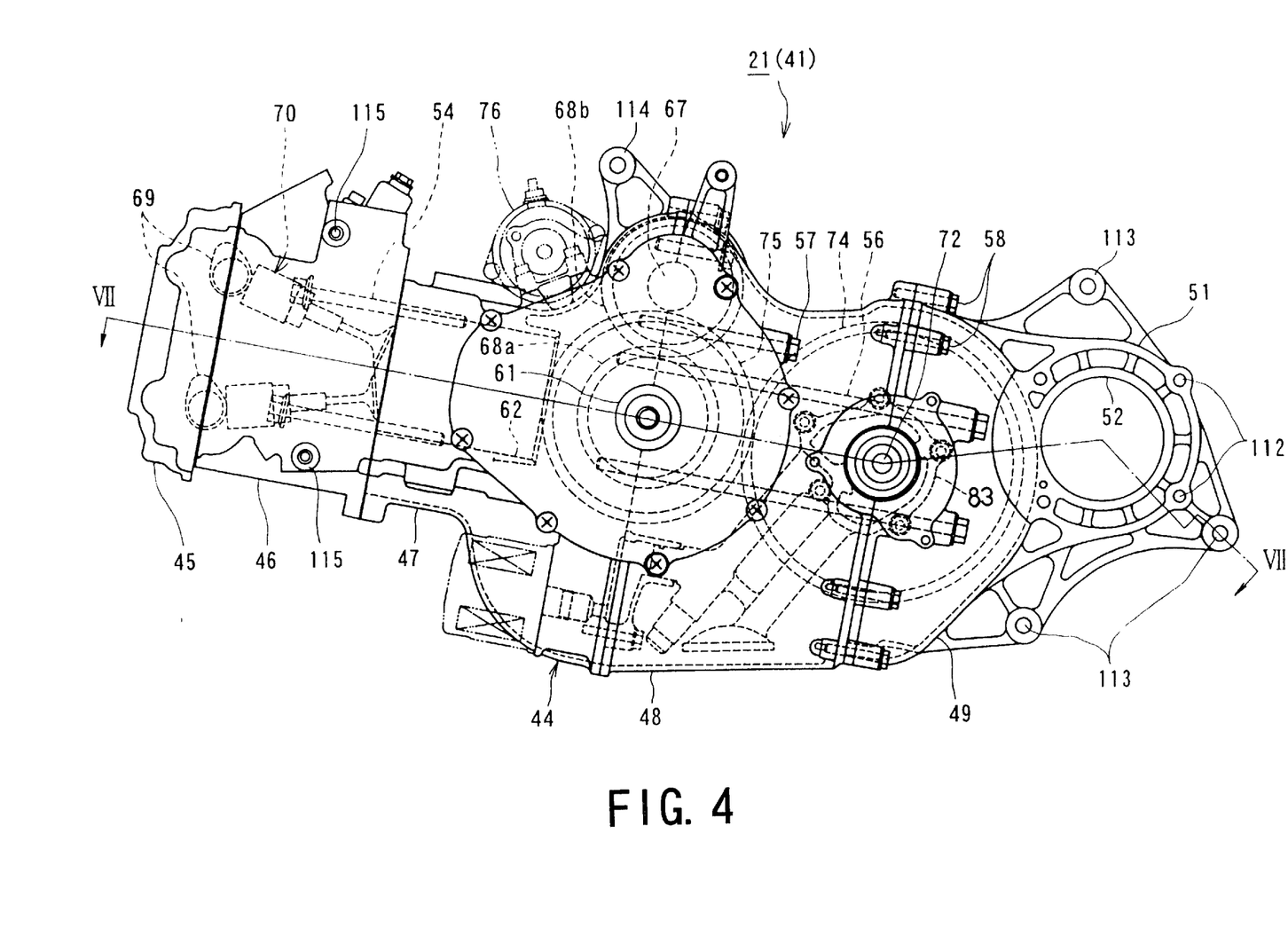
FIG. 4 is a left side view of the power unit showing an internal structure thereof.

As shown in FIGS. 4 and 7, the cylinder head 46 is fastened and fixed to the cylinder block 47 by six long fixing bolts 54 and one short fixing bolt 55, and the crankcase 48 and the rear cover 49 are fastened to the cylinder block 47 by means of six through bolts 56 and a plurality of fixing bolts 57. Since these six through bolts 56 are fastened to the cylinder block 47 after passing through the rear cover 49 and the crankcase 48 from the rear side, the rear cover 49 and the crankcase 48 are fastened together to the cylinder block 47. In this case, the rear cover 49 is also fastened and fixed to the crankcase 48 by other plural fixing bolts 58.

Since a crankshaft 61 disposed along the direction of the vehicle width is pivoted between the cylinder block 47 and the crankcase 48, two right and left cylinder bores 62 are formed within the cylinder block 47. A piston 63 (a piston pin 64) and the crankshaft 61 (a crank pin 65) inserted thereto are connected through a connecting rod 66, a sliding motion of the piston 63 within the cylinder bore 62 is converted into a rotating motion of the crankshaft 61 so as to generate an output of the engine unit 41. In this case, a balancer shaft 67 for canceling an engine vibration is pivoted above the crankshaft 61. This balancer shaft 67 is also pivoted between the cylinder block 47 and the crankcase 48 and is rotated and driven by means of uniform gears 68a and 68b.

On the contrary, two camshafts 69 and a valve system 70 are received in an inner portion of the cylinder head 46. Each of the cam shafts 69 is driven to the crankshaft 61 via a timing chain 71 and operates the valve system 70 at a predetermined timing so as to promote an intake and exhaust operation of the engine unit within the cylinder bore 62.

On the other hand, a counter shaft 72 parallel to the crankshaft 61 is pivoted between the crankcase 48 and the rear cover 49. An axial length of the counter shaft 72 is widely shorter than that of the crankshaft 61, the rear portion of the crankcase 48 corresponding to a receiving portion of the counter shaft 72 and the rear cover 49 are arranged, in an offset manner, close to one side (for example, close to a left side) with respect to a center line C of the vehicle body, and a plan shape of the engine unit 41 is formed in a substantially L-shape together with the bracket portion 51 positioned at the rear thereof in FIG. 7.

Further, since a counter driven gear 74 pivoted to a left end side of the counter shaft 72 through a buffer (absorbing) mechanism 73 is engaged with a counter drive gear 75 formed in a crank web at a left end portion of the crankshaft 61, the counter shaft 72 backward rotates while interlocking with the forward rotating crankshaft 61, whereby a shock or the like generated together with a torque fluctuation of the crankshaft 61 is absorbed by the buffer mechanism 73.

In this case, a right end portion of the crankshaft 61 is covered by a case cover 44a, and a one-way clutch mechanism 77 receiving a power output from a starter motor 76 for starting the engine shown in FIG. 4 is arranged in the inner side thereof. On the contrary, a left end portion of the crankshaft 61 is covered by a case cover 44b, a flywheel 78 and a belt pulley 79 are arranged respectively in the inside and outside of the left end portion of the crankshaft 61 in such a manner as to integrally rotate with the crankshaft 61, and an alternator 80 (refer to FIG. 2) for generating a power is driven by the belt pulley 79 via a belt 81. The alternator 80 is placed above the power unit 21.

Furthermore, a water pump 82 for circulating a cooling water is provided in a left end portion of the counter shaft 72 and a left side portion of the rear cover 49. An oil pump 83 for supplying an engine oil is provided in a right end portion of the counter shaft 72 and an inner portion of the rear cover 49. These pumps 82 and 83 are directly driven by the counter shaft 72.

On the contrary, the transmission unit (change gear unit) 42 has a structure in which a belt-type transmission (for example, CVT) 85 is placed within a casing separately provided from the engine unit 41. A casing 84 is formed as a three-piece structure comprising an inner case 86 positioned in an inner side in a direction of vehicle width, an outer case 87 attached to an outer side thereof in a liquid tight manner and a case cover 88 attached to an outer side thereof.

The belt-type transmission 85 comprises: an input shaft 89 and an output shaft 90 pivoted in a front portion and a rear portion within the casing 84 in parallel to the crankshaft 61; an input V pulley 91 and an output V pulley 92 respectively pivoted to the shafts 89 and 90 so as to integrally rotate; a V belt (or a metal belt) 93 wound between both of the V pulleys 91 and 92; and a facing drive mechanism 94 coaxially provided with the input V pulley 91.

The input V pulley 91 has a stationary facing 95 integrally formed with the input shaft 89 and a movable facing 96 provided so as to move in an axial direction, and a position of the movable facing 96 is determined by the facing drive mechanism 94. Further, the output V pulley 92 also has a stationary facing 97 and a movable facing 98, and the movable facing 98 is always pressed to a side of the stationary facing 97 through a spring 99.

In this case, the input V pulley 91 is arranged close to a left end of the input shaft 89, and the output V pulley 92 is arranged close to a right end of the output shaft 90. The input V pulley 91 and the output V pulley 92 are arranged in such a manner as to be aligned in a longitudinal direction. The facing drive mechanism 94 is arranged in a right side of the input V pulley 91, and a blower composed of the case cover 88 is provided at the rear side of the facing drive mechanism 94 and in a right side of the output V pulley 92. Accordingly, the transmission unit 42 is formed in a substantially L-shape in a plan view.

Furthermore, a bearing boss 101 provided on a front left side surface of the transmission unit 42 (the inner case 86) is closely fitted and fixed to a right side surface of a connecting portion between the crankcase 48 and the rear cover 49 of the engine unit 41. The input shaft 89 extending through the bearing boss 101 and the counter shaft 72 of the engine unit 41 are connected through a spline connection or the like so as to integrally rotate. On the contrary, a rear left side surface or the transmission unit 42 (86) is arranged in adjacent to a right side surface (on a side of the center line C of the vehicle body) of the bracket 51 in the engine unit 41, and a bearing boss 102 of the output shaft 90 is closely fitted to the fitting hole 52 of the bracket 51.

As mentioned above, the engine unit 41 and the transmission unit 42 are formed in a substantially L-shape in a plan view, both the substantially L-shaped portions are combined with each other so as to be formed in a substantially rectangular shape.

On the other hand, the bevel unit 43 has a structure in which a bevel input shaft 105 extending along the width direction of the vehicle body and a bevel output shaft 106 extending along the longitudinal direction of the vehicle body are pivoted to an inner portion of an independent casing 104. An input bevel gear 107 and an output bevel gear 108 engaged with the input bevel gear 107 are respectively provided in the bevel input shaft 105 and the bevel output shaft 106 so as to integrally rotate.

Then, the bevel unit 43 is arranged on a left side surface (on a side opposite to the center line C of the vehicle body) of the bracket portion 51 in the engine unit 41 so as to be adjacent to the bracket portion 51. A bearing boss 109 of the bevel input shaft 105 is closely fitted and fixed to the fitting hole 52 of the bracket portion 51, and the output shaft 90 and the bevel input shaft 105 are connected through a spline connection or the like so as to be integrally rotated.

As shown in FIG. 7, a fastening member such as a through bolt 111 or the like is fastened to the transmission unit 42 from a left side through the bevel unit 43 and the bracket portion 51, and the bevel unit 43 and the bracket portion 51 are fastened together to the transmission unit 42 by the through bolt 111. In this case, totally four through bolts 111 are used, and each of the through bolts 111 extends through a through hole 112 formed around the fitting hole 52 of the bracket 51 at an equal distance as shown in FIG. 4.

In this case, for example, three frame fixing portions 113 are formed around the bracket portion 51. These frame fixing portions 113, one frame fixing portion 114 provided in the cylinder block 47 as shown in FIG. 4 and two frame fixing portions 115 provided in the cylinder head 46 are respectively fastened to fastening portions provided in the down pipes 4, the middle pipes 6 and the pivot plate 10 in the vehicle body frame 2 by fixing bolts 116 (refer to FIG. 7). According to the structure mentioned above, the whole structure of the power unit 21 is fixed to the vehicle body frame 2.

In the described power unit 21, the rotation of the crankshaft 61 of the engine unit 41 is transmitted to the counter shaft 72, the input shaft 89 of the transmission unit 42 and the input V pulley 91, and the rotation of the input V pulley 91 is transmitted to the output V pulley 92 and the output shaft 90 by the V belt 93. Further, the rotation of the output shaft 90 is transmitted to the bevel output shaft 106 via the bevel input shaft 105, the input bevel gear 107 and the output bevel gear 108 in the bevel unit 43, and an engine output is taken out rearward from the bevel output shaft 106.

In this case, since the tooth number of the counter drive gear 75 is smaller than the tooth number of the counter driven gear 74, the rotational speed of the crankshaft 61 is primarily reduced when being transmitted to the counter shaft 72. Furthermore, since the tooth number of the input bevel gear 107 is smaller than the tooth number of the output bevel gear 108, a secondary speed reduction is hence performed.

Then, a rotation of the bevel output shaft 106 is transmitted to a drive shaft 118 pivoted within the swing transmission unit 19 via a universal joint 117 (refer to FIGS. 3, 5 and 6), and a rotation of the drive shaft 118 is transmitted to the rear wheel 18 via a rear bevel gear mechanism 119. In this case, for example, an electromagnetic type starter clutch 120 is arranged to a middle portion of the drive shaft 118, and a power of the engine unit 41 is transmitted and interrupted with respect to the rear wheel 18 in accordance with an ON-OFF operation of the starter clutch 120.

In this case, the facing drive mechanism 94 of the belt-type transmission 85 in the transmission unit 42 moves the movable facing 96 of the input V pulley 91 in an axial direction in accordance with the various conditions such as a vehicle speed, a throttle opening degree, an engine load or the like of the motorcycle 1, on the basis of a power of an actuator controlled by control means (not shown).

For example, at a time when the engine unit of the motorcycle 1 starts, the facing drive mechanism 94 moves the movable facing 96 apart from the stationary facing 95 so as to make minimum an effective diameter of the input V pulley 91 for winding the belt. Together with this operation, since the movable facing 98 is pressed, on the output V pulley 92 side, to the side of the stationary facing 97 due to an urging force of the spring 99 and the effective diameter for winding belt becomes maximum, a gear ratio becomes high and, hence, it becomes possible to easily start.

Further, during the acceleration of the motorcycle 1, the facing drive mechanism 94 gradually moves the movable facing 96 of the input V pulley 91 close to the side of the stationary facing 95 so as to increase the effective diameter of the input V pulley 91 for winding the belt. Then, in the output V pulley 92 side, since the movable facing 98 moves apart from the stationary facing 97 against the urging force of the spring 99, and the effective diameter for winding the belt is reduced, the gear ratio becomes low and a vehicle speed is increased.

As mentioned above, according to the power unit 21 of the present invention, the engine unit 41, the transmission unit 42 and the bevel unit 43, which are independently provided and formed in a sealed manner, are integrally combined, it is possible to manufacture the respective units 41, 42 and 43 in different production sites and it is also possible to ensure a significantly high productivity.

Furthermore, in the case of changing the specification such as the engine output, the gear ratio or the like or maintaining a specific portion, only one of three units 41, 42 and 43 may be disassembled or replaced, so that the maintenance can be easily made and it is possible to be easily applied to various kinds of vehicles.

In addition, since the bearing boss 102 of the variable change unit 42 and the bearing boss 109 of the bevel unit 43 are coaxially fitted and fixed to the fitting holes 52 of the bracket portion 51 in the engine unit 41, it is unnecessary to form many fitting portions, fixing portions or the like, so that it is possible to improve a manufacturing quality and reduce processing working, and further it is possible to increase an assembling rigidity of the whole structure of the power unit 21.

Furthermore, since the engine unit 41 and the transmission unit 42 which are formed in substantially L-shape in a plan view are combined with each other so as to be formed in substantially rectangular shape in a plan view, no dead space is generated between the engine unit 41 and the transmission unit 42. Furthermore, since the transmission unit 42 is arranged on the side of the center line C of the vehicle body (the right side) of the bracket 51 arranged, in an offset manner, close to one side (in this case, close to the left side) with respect to the center line C of the vehicle body. The bevel unit 43 having a lateral width smaller than that of the transmission unit 42 is arranged in the side opposite to the center line C of the vehicle body (the left side) of the bracket portion 51. Any one of the transmission unit 42 and the bevel unit 43 does not protrude sideward more largely than the lateral width of the engine unit 41. Accordingly, it is possible to make compact the sizes of the power unit 21 in the longitudinal direction and the width direction.

Further, in this power unit 21, since the bracket portion 51, the transmission unit 42 and the bevel unit 43 in the engine unit 41 are fastened together by the through bolts 111 disposed along the direction of the vehicle width, it is possible to widely reduce the number of the fastening members (the through bolts 111) and simultaneously reduce the number of the assembling time and labor of workers so as to widely increase a productivity of the power unit 21, in comparison with the case that the transmission unit 42 and the bevel unit 43 are respectively fastened to the bracket portion 51 by using the exclusive fastening members.

On the contrary, since the frame fixing portion 113 for fixing the power unit 21 to the vehicle body frame 2 is formed in the bracket portion 51 of the engine unit 41, the connecting portion (that is, the bracket portion 51) of three units 41, 42 and 43, constituting the power unit 21, is firmly fixed to the vehicle body frame 2. Thus, it is possible to increase a supporting rigidity of the whole of the power unit 21 to the vehicle body frame 2.

In the present invention, the power unit 21 is not limited to the structure of the scooter-type motorcycle and may be also applied to a power unit for other types of motorcycles or other kinds of vehicles.

That is, it is to be noted that the present invention is not limited to the described embodiment and many other changes and modifications may be made without departing from the scopes of the appended claims.

What is claimed is:

1. A power unit of a motorcycle comprising:

an engine unit in which a counter shaft rotating, while interlocking with a crankshaft, is supported in parallel at a rear portion in a casing of an engine body provided with the crankshaft disposed along a width direction of a motorcycle body and a bracket portion having a fitting hole extending rearward so as to pass through in the width direction of the motorcycle body is formed in a rear portion outside the casing;

a transmission unit in which an input shaft and an output shaft are pivoted at front and rear portions in another casing different from the casing of the engine unit so as to constitute a transmission device; and a bevel unit receiving a bevel input shaft disposed along the width direction of the motorcycle body, a bevel output shaft disposed along a longitudinal direction of the motorcycle body and a bevel gear which are all disposed in a further casing so as to take out an engine output rearward from the bevel output shaft, wherein one side surface of a front portion, in the longitudinal direction of the motorcycle body, of the transmission unit is fixed to one side surface of a rear portion of the casing in the engine unit so as to connect the counter shaft to the input shaft to be integrally rotatable, a bearing boss of the output shaft is closely fitted to the fitting hole in the bracket portion with one side surface of the rear portion of the transmission unit being disposed adjacent to one side surface of the bracket portion of the engine unit, and the bearing boss of the bevel input shaft is closely fitted and fixed to the fitting hole of the bracket portion with the bevel unit being disposed adjacent to another side surface of the bracket portion so as to connect the output shaft to the bevel input shaft to be integrally rotatable.

2. A power unit of a motorcycle according to claim 1, wherein the counter shaft receiving portion of the engine unit is arranged, in an offset manner, close to one side with respect to a center line of the motorcycle body in a plan view and the bracket portion is extended to a rear portion thereof so as to provide a plan shape of the engine unit to be a substantially L-shape and a plan shape of the transmission unit to be a substantially L-shape to thereby arrange the transmission unit on a side of the center line of the motorcycle body in the bracket portion so as to assemble substantially L-shaped portions of the engine unit and the transmission unit with each other to provide a substantially rectangular shape, and on the other hand, the bevel unit is arranged on a side opposite to the center line of the vehicle body in the bracket portion.

3. A power unit of a motorcycle according to claim 1, wherein the bracket portion of the engine unit, the transmission unit and the bevel unit are fastened together by a fastening member disposed along the width direction of the motorcycle body.

4. A power unit of a motorcycle according to claim 1, wherein the motorcycle body frame fixing portion of the power unit is formed to the bracket portion of the engine unit.

5. A power unit of a motorcycle according to claim 1, wherein said transmission device is a belt-type change gear device disposed in the another casing having a three-piece structure.

6. A power unit of a motorcycle according to claim 5, wherein said belt-type change gear device includes an input shaft supported in parallel to the crankshaft of the engine unit and the input shaft is operatively coupled with the bevel input shaft.

* * * * *